United States Patent
Gill et al.

(10) Patent No.: US 10,196,287 B2
(45) Date of Patent: Feb. 5, 2019

(54) FOULING MITIGATION IN EQUIPMENT USED DURING HYDROCARBON PRODUCTION

(71) Applicant: ECOLAB USA, INC., St. Paul, MN (US)

(72) Inventors: Jasbir S Gill, Naperville, IL (US); Edward Maharajh, Calgary (CA); Thomas M. Miller, Aurora, IL (US)

(73) Assignee: ECOLAB USA INC., St. Paul, MN (US)

( * ) Notice: Subject to any disclaimer, the term of this patent is extended or adjusted under 35 U.S.C. 154(b) by 419 days.

(21) Appl. No.: 13/798,572

(22) Filed: Mar. 13, 2013

(65) Prior Publication Data
US 2014/0263078 A1      Sep. 18, 2014

(51) Int. Cl.
*C02F 5/10* (2006.01)
*C02F 1/68* (2006.01)
*C02F 103/36* (2006.01)

(52) U.S. Cl.
CPC .............. *C02F 1/682* (2013.01); *C02F 5/10* (2013.01); *C02F 2103/365* (2013.01)

(58) Field of Classification Search
None
See application file for complete search history.

(56) References Cited

U.S. PATENT DOCUMENTS

| | | | | |
|---|---|---|---|---|
| 3,931,006 A | * | 1/1976 | Baillie | B01D 11/0219 208/391 |
| 4,326,980 A | * | 4/1982 | Snyder | C02F 1/54 210/701 |
| 4,650,591 A | * | 3/1987 | Boothe | C23F 11/173 210/700 |

(Continued)

FOREIGN PATENT DOCUMENTS

| | | |
|---|---|---|
| EP | 1947062 A2 | 7/2008 |
| KR | 10 2007-0091246 A | 9/2007 |
| WO | WO 2012/018976 A2 | 2/2012 |

OTHER PUBLICATIONS

International Search Report and the Written Opinion from corresponding PCT Appln. No. PCT/US2014/016033 dated Jun. 18, 2014 (12 pgs).

*Primary Examiner* — Dirk R Bass
*Assistant Examiner* — Donovan Bui-Huynh
(74) *Attorney, Agent, or Firm* — Eric D. Babych; Brinks Gilson & Lione

(57) ABSTRACT

Methods for dispersing foulants are disclosed herein. Various effective dispersant compositions are also disclosed. The dispersant composition can include a silt dispersant and a hydrocarbon dispersant. Generally, the silt dispersant can be a homopolymer or a copolymer of one or more monomers, and the monomers can be one or more of acrylic acid, methacrylic acid, α-halo acrylic acid, maleic acid, itaconic acid, vinyl acetic acid, allyl acetic acid, fumaric acid, β-carboxylic acrylate, and their salts. The silt dispersant can (Continued)

also be a terpolymer of acrylic acid, acrylamide, and sulfonated acrylamide. The hydrocarbon dispersant can be a non-ionic surfactant or a nonylphenol or a nonylphenol ethoxylate, such as a high EO 9 Nonyl phenol resin. Also disclosed are methods for preventing or reducing fouling in equipment that contacts water used during a hydrocarbon production process.

11 Claims, 2 Drawing Sheets

(56) References Cited

U.S. PATENT DOCUMENTS

| | | | | |
|---|---|---|---|---|
| 6,139,830 | A * | 10/2000 | Donlan | C02F 1/50 |
| | | | | 424/405 |
| 2003/0129318 | A1* | 7/2003 | Elder | C08G 14/06 |
| | | | | 427/425 |
| 2006/0094636 | A1* | 5/2006 | Rodrigues | C02F 1/56 |
| | | | | 510/476 |
| 2007/0015901 | A1* | 1/2007 | Sikes | C08G 73/1092 |
| | | | | 528/328 |
| 2011/0071065 | A1* | 3/2011 | Silvernail | C11D 3/365 |
| | | | | 510/219 |
| 2012/0219480 | A1* | 8/2012 | Simpson | B01D 47/14 |
| | | | | 423/210 |

* cited by examiner

FOULING MITIGATION IN EQUIPMENT USED DURING HYDROCARBON PRODUCTION

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING, A TABLE, OR A COMPUTER PROGRAM

Not applicable.

BACKGROUND OF THE INVENTION

1. Field of the Invention

The disclosure pertains to fouling mitigation in equipment used during hydrocarbon production. In particular, the disclosure pertains to compositions useful for the mitigation of oil, hydrocarbon, silt, insoluble organics, and precipitated inorganic minerals fouling in equipment used during hydrocarbon production, such as heat exchangers.

2. Description of the Related Art

When crude oil or bituminous sands are located sufficiently below the surface of the earth, oil wells can be drilled to assist in the extraction of these materials. However, heavy hydrocarbons can prove difficult to recover or produce due to their high viscosities. Various extraction, recovery, or production methods are known in the art such as flooding the formation with heated water or steam in an attempt to reduce the viscosity of the hydrocarbons to enable flow and aid in production.

One such method known as Cyclic Steam Simulation or the "huff-and-puff" method involves stages of injecting high pressure steam, soaking the formation, and production. The initial stage involves steam injection for a period of weeks to months to heat the hydrocarbon, bitumen or heavy oil resource in the reservoir, thereby reducing its viscosity such that it will be able to flow. Following injection, the steam is allowed to soak in the formation for a period of days to weeks to allow heat to further penetrate the formation. The heavy oil, sufficiently reduced in viscosity, is then produced from the same well until production begins to decline upon which time the three step cycle is repeated. This method requires large amounts of water and the water is generally recycled or reused throughout the process.

Another recovery or production method used in the art is referred to as steam assisted gravity drainage (SAGD). The SAGD recovery method relies on two parallel, horizontal wells approximately 1 km in length. An upper "injector well" resides above a lower "producing well." The producing well is situated as close as possible to the bottom of the reservoir. Initially, steam is injected into both wells to begin heating the formation. After a period of time, the formation is sufficiently heated such that the viscosity of the hydrocarbons or bitumen is reduced and the hydrocarbons or bitumen are now able to enter the production well. Once this occurs, steam injection into the production well is ceased.

Low pressure steam is continuously injected into the injector well, resulting in the formation of a steam chamber, which extends laterally and above as the process continues. At the edge of the steam chamber, the steam releases its latent heat into the formation. This process heats the hydrocarbons and/or bitumen causing it to be sufficiently reduced in viscosity to drain along the edge of the steam chamber under the influence of gravity to the lower producing well. It can then be pumped to the surface along with the resultant steam condensate. At that point, the formed water and bitumen emulsion is broken and sent to a separation vessel for separation of the hydrocarbons and water.

In addition to imparting a viscosity reduction on the hydrocarbons and/or bitumen, the steam condenses and a hydrocarbon-in-water emulsion forms allowing the hydrocarbon to travel more readily to the producing well. SAGD processes typically recover about 55% of the original hydrocarbon or bitumen-in-place over the lifetime of the well.

The SAGD process relies on the energy intensive production of steam to assist with bitumen recovery. It requires natural gas, significant amounts of fresh water, and water recycling plants.

As can be seen, in the hydrocarbon production industry, large amounts of water can be necessary for the successful recovery or production of various hydrocarbons. Generally, the water is recycled or reused throughout production. Over time, recycled or reused water can become contaminated with silt, sand, clay, hydrocarbons, oil, grease, and other organic materials. As this contaminated water is recycled through the various pieces of equipment used in connection with hydrocarbon recovery, the various pieces of equipment can become contaminated or fouled.

In certain circumstances, the hydrocarbon being produced from a well can be in the form of an oil in water emulsion. The emulsion can then be broken and transferred to a separation vessel. Although most of the hydrocarbons are separated from the water in the separation vessel, the water leaving the separation vessel can still contain certain impurities. This water is subsequently sent to a heat exchanger, and possibly other components, where it can be heated and sent back into the well for further use in production. Since the water cannot be perfectly purified in the separation vessel, it can still contain certain impurities, such as silt, sand, clay, hydrocarbons, and other organic materials. These impurities are carried with the water into the heat exchanger or other components of the system and the impurities can cause fouling of the various pieces of equipment.

For example, as the impure water passes through the heat exchanger, heavy tar-like deposits can accumulate on both the shell side and tube side of the heat exchangers. If the recycled water passing through the heat exchanger has a high concentration of impurities, heavy fouling can occur. In certain situations, the fouling can comprise from about 20-60% sand and clay, from about 20-40% hydrocarbon (such as bitumen), and 10-50% insoluble organics, such as polar organics or organic salts, which could be a combination of naphthenates and demulsifier chemicals, such as esters and oxylakylates. Fouling of the heat exchangers can be very detrimental to the entire operation and can significantly limit and even stop production. For example, from the beginning of the production or recovery process, it could take as little as two weeks for the heat exchanger to become significantly fouled such that it will need to be taken off-line and cleaned, and while it is being cleaned, production or recovery will come to a halt.

Currently, the industry deals with this problem by allowing the heat exchanger to become fouled to the point where either the flow of water is heavily restricted or no effective heat transfer is occurring between the water and the heat exchanger. At that point, the system is stopped and the exchanger is cleaned using certain chemicals and hydroblasting. Since the system must be stopped to clean the exchanger, hydrocarbon recovery or production is significantly reduced over time.

To allow production to continue while the heat exchanger is being cleaned, some sites have a second heat exchanger on standby and when the original heat exchanger accumulates a high degree of fouling, the heat exchanger is taken off-line and the second heat exchanger is substituted therefor. While the second heat exchanger is on-line or in operation, the fouling in the original heat exchanger is cleaned and then this heat exchanger is placed on standby and substituted back into the process once the second heat exchanger accumulates a high degree of fouling. Although this can be a possible solution to the fouling problem, it requires a large amount of labor to manually clean out the fouled heat exchanger and it also requires a large amount of capital as at least two heat exchangers will need to be purchased. Thus, a different solution to the problem of fouling in heat exchangers is desirable.

BRIEF SUMMARY OF THE INVENTION

Methods for dispersing foulants are disclosed. The methods can comprise the step of contacting said foulants with an aqueous solution comprising a dispersant composition, wherein said dispersant composition comprises a silt dispersant and a hydrocarbon dispersant.

Methods for preventing or reducing fouling in equipment that contacts water used during a hydrocarbon production process are also disclosed. The methods can comprise the steps of adding to said water a composition comprising a silt dispersant and a hydrocarbon dispersant, dispersing one or more foulants contained in said water, thereby preventing fouling of the equipment, or dispersing one or more foulants deposited on said equipment, thereby reducing fouling of the equipment.

The foregoing has outlined rather broadly the features and technical advantages of the present disclosure in order that the detailed description of the invention that follows may be better understood. Additional features and advantages of the disclosure will be described hereinafter that form the subject of the claims. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION OF THE INVENTION

Figure 1:
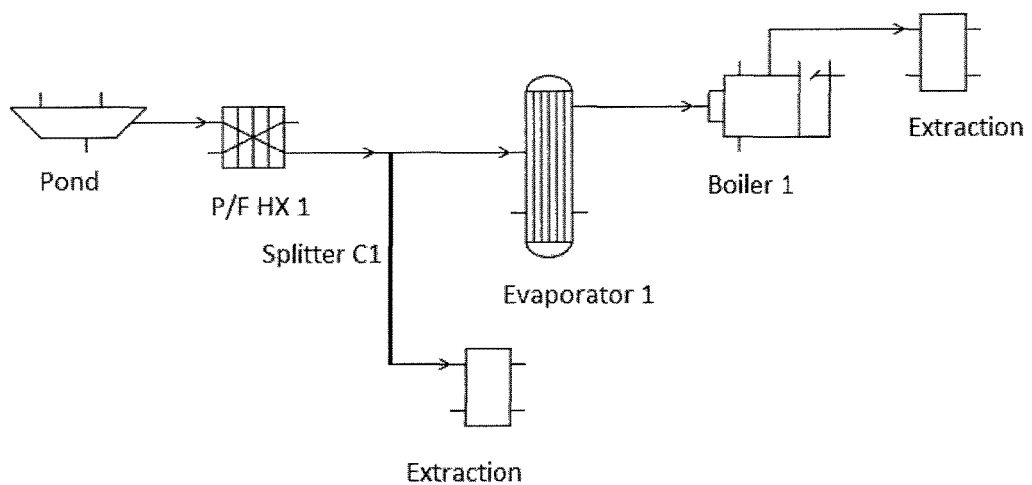
FIG. 1 is a schematic view of a hydrocarbon production process.

This disclosure relates to fouling mitigation in equipment used during hydrocarbon production. As described above, as impure water is recycled through the various pieces of equipment used during hydrocarbon production, such as heat exchangers, fouling can occur in the equipment. However, if the water being used in the production of the hydrocarbons is treated with the dispersant composition disclosed herein, fouling of the equipment may not occur or at least the fouling can be significantly mitigated. The types of equipment that could become fouled and thus could be treated by the dispersant composition disclosed herein can include, but are not limited to, evaporators, once through steam generators, and heat exchangers.

It has been found that in a hydrocarbon recovery system, fouling of the equipment can be caused by silt, sand, or clay contained in the water. Tar, organic materials, and hydrocarbons can become trapped in the silt, sand, or clay, thereby causing further fouling. The disclosed dispersant compositions have been discovered by taking into account the different types of foulants that are encountered in these processes.

In an aspect, the dispersant compositions disclosed herein can include a clay/silt/inorganic mineral dispersant, a hydrocarbon dispersant, or a synergistic mixture of a clay/silt/inorganic mineral dispersant and a hydrocarbon dispersant. Hereinafter, the term "clay/silt/inorganic mineral dispersant" is used interchangeably with the term "silt dispersant" and both terms are to be understood as referring to the same dispersant.

The clay/silt/inorganic mineral dispersant can be a homopolymer or a copolymer of several monomers randomly polymerized. Examples include, but are not limited to, acrylic acid, methacrylic acid, α-halo acrylic acid, maleic acid, itaconic acid, vinyl acetic acid, allyl acetic acid, fumaric acid, β-carboxylic acrylate, and their salts and admixtures.

In certain aspects, the clay/silt/inorganic mineral dispersant is a copolymer of acrylic acid and methacrylic acid. Salts of these monomers can be used as well. In another aspect, the clay/silt/inorganic mineral dispersant comprises acrylic acid. In other embodiments, the acrylic acid monomer can be copolymerized with any one of Styrene sulfonic acid, 2-acrylamido-2-methylpropylsulfonic acid, 2-methyacrylimido-2-methylpropylsulfonic acid, vinyl sulfonic acid, sulfoalkyl acrylate, sulfoalkyl methacrylate, allyl sulfonic acid, 3-methacrylamido-2-hydroxypropylsulfonic acid, and their salts and mixtures.

In an aspect, the clay/silt/inorganic mineral dispersant is a terpolymer of acrylic acid, acrylamide, and sulfonated acrylamide, which is interchangeably referred to herein as Dispersant 1.

In certain aspects, the silt dispersant can be diluted in an aqueous solution, such as water, in an amount from about 0.5 parts per million (ppm) to about 200 ppm, based upon the volume of water. In other aspects, the silt dispersant can be diluted in an aqueous solution, such as water, in an amount from about 60 ppm to about 100 ppm, based upon the volume of water. In further aspects, the silt dispersant can be diluted in an aqueous solution, such as water, in an amount from about 0.5 ppm to about 2.5 ppm, based upon the volume of water, in an amount from about 0.5 ppm to about 10 ppm, based upon the volume of water, in an amount from about 2.5 ppm to about 50 ppm, based upon the volume of water, or any other amount or range between 0.5 ppm and 200 ppm.

The hydrocarbon dispersant can be nonylphenol (NP) or nonylphenol ethoxylates (NPEs). NPEs are surface active agents (surfactants) that are part of the broader category of surfactants known as alkylphenol ethoxylates (APEs). There is enormous variability in the structure of non-ionic surfactants that can be used in accordance with the present disclosure. Most non-ionic surfactants rely on polyethoxylation to provide the hydrophilic moiety. Others rely on glycerol (glycerin), glucosides, or other sugars, either as monosaccharides (e.g. sorbitol) or disaccharides (e.g. sucrose or Seidel 2004c). In certain aspects of this disclosure, the substitution for NPEs is to use other APEs. NPEs are one of many APEs available commercially. Other alternatives that can be used in accordance with this disclosure for NPEs include alcohol ethoxylates, both linear and branched, and glucose-based carbohydrate derivatives such as alkylpolyglucoside, glucamides, and glucamine oxides. In a particular aspect, the hydrocarbon dispersant is high EO 9 Nonyl phenol resin, which is a low foaming surfactant belonging to the family of alkylphenol ethoxylate surfactants, and is interchangeably referred to herein as Dispersant 2.

In certain aspects, the hydrocarbon dispersant can be diluted in an aqueous solution, such as water, in an amount from about 0.5 parts per million (ppm) to about 150 ppm, based upon the volume of water. In other aspects, the hydrocarbon dispersant can be diluted in an aqueous solution, such as water, in an amount from about 50 ppm to about 70 ppm, based upon the volume of water. In further aspects, the hydrocarbon dispersant can be diluted in an aqueous solution, such as water, in an amount from about 0.5 ppm to about 2.5 ppm, based upon the volume of water, in an amount from about 0.5 ppm to about 10 ppm, based upon the volume of water, in an amount from about 2.5 ppm to about 50 ppm, based upon the volume of water, or any other amount or range between 0.5 ppm and 150 ppm.

In relation to dispersing clay, silt, or inorganic minerals, the presently disclosed clay/silt/inorganic mineral dispersant can act by imparting and increasing the negative charge on to the clay, silt, or inorganic mineral particles. However, when clay, silt, or inorganic minerals is incorporated into hydrocarbons, grease, or oil, it has now been discovered that a practitioner would also need to disperse the hydrocarbons, grease, or oil. Thus, the present disclosure can incorporate a hydrocarbon dispersant, such as high EO 9 Nonyl phenol resin. This dispersant can work both as detergent and for breaking crude oil emulsions without causing any foaming. In accordance with the present disclosure, the hydrocarbon dispersant can be a branched, high-molecular weight condensation product, which is ethoxylated. The combination of the two dispersants (clay/silt/inorganic mineral dispersant and a hydrocarbon dispersant) can provide a dispersant composition capable of attacking both clay, silt, and/or inorganic mineral fouling, in addition to hydrocarbon fouling.

In relation to FIG. 1, which depicts a schematic view of a hydrocarbon production field operation, the presently disclosed dispersant composition could be added at any time during production. For example, the dispersant composition could be added to the inlet of the heat exchanger. This addition point is shown by the arrow between the pond and the heat exchanger titled "P/F HX 1." Water stored in the pond is added to the inlet of the heat exchanger and the presently disclosed dispersant composition could be added in combination with the pond water to the inlet of the heat exchanger in the amounts described above.

In certain aspects, the dispersant composition is continuously added throughout production. In other aspects, if production has already started, the dispersant composition can be added after hydrocarbon production has started to reduce any fouling that has already occurred on the equipment. Alternatively, the dispersant composition can be added at the beginning of production to mitigate or prevent fouling of the equipment throughout the production cycle.

The disclosed dispersant composition can mitigate fouling and keep the equipment clean by dispersing the foulants, thereby allowing for maximum production or recovery since no equipment will need to be taken off-line and cleaned. Moreover, the disclosed dispersant can be incorporated into the water of a hydrocarbon recovery or production process already in progress and can mitigate fouling of the equipment and actually clean any existing deposits or fouling on the equipment being used in the system.

The foregoing may be better understood by reference to the following examples, which are intended only for illustrative purposes and are not intended to limit the scope of the invention.

EXAMPLE 1

On both the tube side and the shell side of a heat exchanger being used in hydrocarbon recovery, extraction, or production, heavy tar-like deposits can accumulate. The deposits can have many different components and each component can comprise a different amount of the total deposit. For example, a deposit on the tube side can be from 45-55% sand and clay, 30-40% normal hydrocarbon (bitumen), and the remainder of the deposit can be 10-20% insoluble organics, such polar organics or organic salts, which might be a combination of naphthenates and demulsifier chemicals (such as esters and/or oxyalkylates).

With this information in mind, the present inventors performed laboratory studies to find a dispersant composition or solution to mitigate fouling. However, since the same water contacting the tube side of the exchanger could also contact the shell side of the exchanger, the results depicted below would be equally applicable to the shell side of the heat exchanger, the tube side of the heat exchanger, and any other piece of equipment that would come into contact with the production water, such as evaporators and once through steam generators. The experiments referred to below were conducted with contaminated water from the HTS (high temperature separator) outlet used in the field during hydrocarbon production.

Based on the mechanical, operational, and water chemistry involved in this process, the present inventors developed a procedure to mimic the actual heat exchanger conditions found in the field. Since, in the course of normal operation, the heat exchangers can face temperatures of about 220° C. and high pressures, the use of a high-pressure vessel was required to conduct the present experiments.

Two different samples of water were obtained by the inventors, hereinafter referred to as phase I and phase II waters. Both of the samples came from water that was actually being used in the field during hydrocarbon production. The first water sample as received had layers and blobs of tar (oil and grease) in addition to the water miscible organics in the water. The water samples were homogenized so that a representative sample could be taken for testing. Homogenization was accomplished by heating the sample water to 65° C. overnight with stirring.

The inventors also used a test coupon for quantitative evaluation. The test coupon was placed in an autoclave that was used to carryout the experiments, which mimicked a heat exchanger. The coupon was easily removable from the inside of the autoclave so that the fouling thereon could be quantified. For the test coupon, the inventors used a propeller, which is removable from the mixing shaft of the autoclave. Actually, the mixing shaft included two propellers, a lower propeller near the bottom of the mixing shaft and an upper propeller located near the mid-point of the mixing shaft, and the lower propeller was used as the test coupon in these studies.

The experiments were done using a specially designed autoclave to accommodate high pressure and temperatures of around 220° C. The jacket of the autoclave was made of 316 stainless steel.

In the first set of experiments, the autoclave was charged with 470 ml of the phase I HTS outlet water and as noted below, some of the experiments also incorporated certain dispersant compositions of the present disclosure. The water sample container was heated to 65° C. overnight and then shaken vigorously before addition to the autoclave. Once added to the autoclave, the water was stirred with the mixing shaft and heated to 220° C. The pressure based on the water vapor in the autoclave was about 310 PSI. The temperature and stirring were maintained for 60 to 75 minutes and then shut off to complete the experimental procedure.

The same experiment described above was also conducted with a second water sample, the phase II water sample, obtained from the hydrocarbon production site.

After the experiments were completed, the autoclave was opened, the water was poured out, and it was visually observed, in the experiments that did not incorporate an aspect of the presently disclosed dispersant composition, that the mixer shaft, propellers, dip tube, and especially the thermocouple, were all coated with a highly viscous tar.

In the absence of any dispersant compositions, it appeared that oil, grease, and the soluble hydrocarbons became homogenized in the aqueous phase and became very sticky, similar to tar. The sticky aqueous phase coated everything that it came into contact with, such as the internals of the autoclave, the dip tube, the mixer shaft, the propellers, the inner surface of the vessel and the vessels (glass or plastic) to which the liquid was poured into. After the completion of each experiment, the lower propeller was removed from the mixing shaft and weighed.

Each experiment was run in duplicate, so there were a total of 14 experiments that were carried out over period of six weeks. Due to the presence of grease and silt, special cleaning procedures for the equipment were developed. Prior to the start of each experiment, all equipment was thoroughly cleaned to make sure that the test coupon (lower propeller) came to a constant weight. Thereby, the inventors knew the weight of the lower propeller without any deposits thereon and could compare this weight to the weight of the propeller when it included deposits after the completion of the experiments.

With respect to the first water or the phase I water, the following experimental conditions were used:
1. Blank or control, no inhibitor/dispersant
2. Blank or control, no inhibitor/dispersant
3. 29 PPM Dispersant 1 and 30 PPM Dispersant 2
4. 27 PPM Dispersant 1 and 187 PPM Dispersant 2
5. 69 PPM Dispersant 1 and 99 PPM Dispersant 2

With respect to the second water or the phase II water, the following experimental conditions were used:
1. Blank or control, no inhibitor/dispersant
2. 52 PPM Dispersant 1 and 68 PPM Dispersant 2

For all of the experiments that incorporated an aspect of the presently disclosed dispersant composition, the dispersant compositions were added at the time of addition of the water to the autoclave. In the experiments run where the dispersant composition was present, the volume of the water was adjusted to accommodate for the inhibitor volume for a total of 470 ml charged to the autoclave. After addition of the water, the autoclave was sealed, heating and stirring began, and the experimental protocol described above was followed.

Due to serious difficulties with respect to the reproducibility of the sampling of the water in to the autoclave, and poor reproducibility of certain deposits, the inventors evaluated the efficacy of treatment using visual observations, in addition to the quantitative propeller deposit weight analysis.

The deposits were known to contain silt, clay, inorganic minerals, organics, hydrocarbons, etc., so the inventors evaluated a combination of two dispersants, one targeted for clay, silt, and/or inorganic minerals and another targeted for hydrocarbons.

The hydrocarbon dispersant used in the experiments was high EO 9 Nonyl phenol resin (Dispersant 2) and the clay, silt, and/or inorganic mineral dispersant used in the experiments was Dispersant 1, which is a terpolymer of acrylic, acrylamide and sulfonated acrylamide.

The results of the various experiments are summarized below in Table 1:

TABLE 1

Summary of the Results

| Test # | Water | Treatment Dose PPM | Deposit Weight Mg | % Red. | Comments |
|---|---|---|---|---|---|
| 1 | First | None | 132 | — | Deposit is uniform on all parts |
| 2 | First | None | 158 | — | Uniform but some blobs on the propeller, silt incorporated |
| 3 | First | 29/30* | 81 | 44 | Looked much cleaner, couple globs. No silt |
| 4 | First | 27/187* | 81 | 44 | Much less coated with tar and slit |
| 5 | First | 69/99* | 25 | 83 | Very clean, no silt |
| 6 | 2$^{nd}$ | None | 36 | — | Uniform coating of tar |
| 7 | 2$^{nd}$ | 52/68* | 13 | 64 | Very clean, no silt, no tar |

The treatment dose ratio refers to the amount of Dispersant 2 to the amount of *Dispersant 1. For example, in test number 3, 29 ppm of Dispersant 2 was used and 30 ppm of Dispersant 1 was used.

As can be seen, in the blank runs with the phase I or first water, the total amount of deposit on the lower propeller ranged from 132 mg to 158 mg, giving an average deposit weight of 145 mg. The results show up to an 83% reduction in deposit weight when using a particular embodiment of the presently disclosed dispersant composition, and the surfaces of the various components in the autoclave all looked very clean as compared to the blank runs.

With respect to the second water or phase II water, a 64% reduction in deposit weight was achieved over the blank run by using a particular embodiment of the presently disclosed dispersant composition.

The results indicated that the surfaces found inside of the autoclave were much cleaner when aspects of the disclosed dispersant composition were added to the water and as the dosage of the dispersant composition was increased, less deposit was generally observed on the various parts or surfaces of the autoclave. The experiments provided excellent results in terms of fouling mitigation abilities of the dispersant compositions based on both physical observations and deposit weights. The presently disclosed dispersant compositions can eliminate deposit anywhere, such as on the propellers and the other internals of the autoclave, and these results are considered to be completely reproducible in the field on the various pieces of equipment that would come into contact with the production water, such as a heat exchanger, during hydrocarbon production, extraction, or recovery.

EXAMPLE 2

Figure 2:
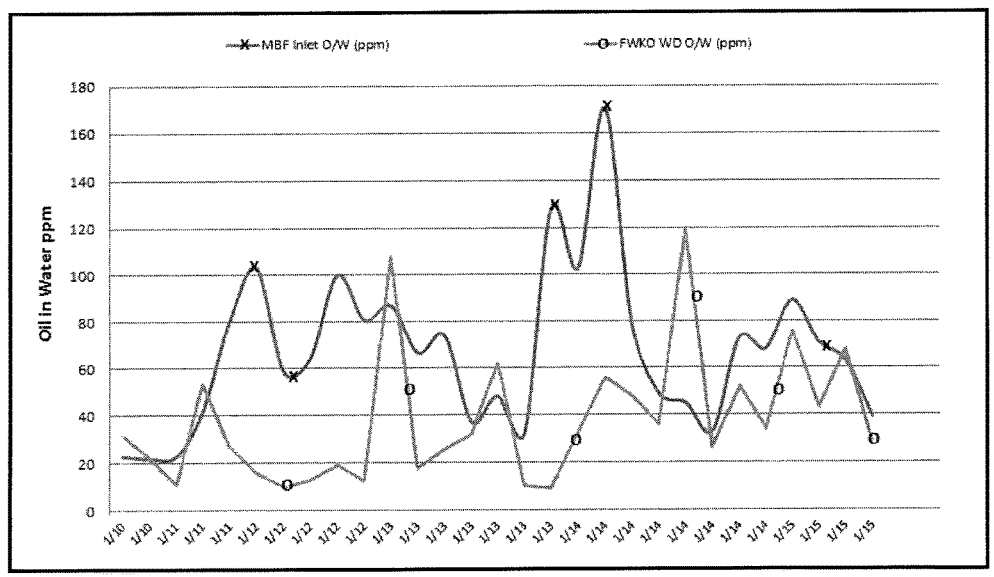
FIG. 2 is a graph depicting the results of an experiment testing the amount of oil in water before and after treatment with an aspect of the presently disclosed dispersant.

As can be seen in FIG. 2, example 2 supports the fact that aspects of the presently disclosed dispersants can actually clean any existing deposits or fouling on the equipment being used in the system. In example 2, Dispersant 3 was used, which is a 50/50 mixture of 1) a terpolymer of acrylic acid, acrylamide, and sulfonated acrylamide, and 2) ethoxylated phenol. Dispersant 3 was injected at a dose of 2.5 mg/L, directly into the outlet of the free water knock out (FWKO) which is located before the micro bubble flotation (MBF) tank. The rise in the oil in water, as can be seen in FIG. 2, going to the MBF inlet was the biggest indication that existing deposits of oil from the pipes was being cleaned. From the FWKO feed to the MBF tank inlet there is a large oil in water increase indicating oil removal from the pipe walls. This is also supported by an increase in turbidity indicating cleaning of the existing deposit containing both oil and silt. Thus, the presently disclosed dispersants can not only mitigate or prevent fouling, but they can also cleaning the existing deposit.

During the limited time available in the system Dispersant 3 showed the ability to strip oil off the lines from the FWKO dump to the produced water coolers (PWCs) and through the MBF tank. This may also translate to ultimately dispersing bitumen through the coolers to reduce fouling.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method for dispersing a deposit, comprising:
    contacting the deposit with an aqueous solution comprising a dispersant composition, wherein said dispersant composition comprises a silt dispersant and a hydrocarbon dispersant, wherein the silt dispersant is a terpolymer of acrylic acid, acrylamide, and sulfonated acrylamide, wherein the deposit comprises silt and a component selected from the group consisting of tar, grease, oil, bitumen, organic salt, naphthenate, hydrocarbon, and any combination thereof; and dispersing the deposit,
    wherein the hydrocarbon dispersant is a high EO 9 Nonyl phenol resin, and
    wherein the aqueous solution comprises from about 0.5 ppm to about 150 ppm of the hydrocarbon dispersant and from about 0.5 ppm to about 200 ppm of the silt dispersant, based on the volume of the aqueous solution.

2. A method for preventing or reducing fouling in equipment that contacts water used during a hydrocarbon production process, the method comprising:
    adding to the water a composition comprising water, a silt dispersant and a hydrocarbon dispersant,
    wherein the hydrocarbon dispersant is a high EO 9 Nonyl phenol resin, wherein the water comprises silt and a foulant selected from the group consisting of tar, grease, oil, bitumen, organic salt, naphthenale, and any combination thereof; and
    preventing fouling of the equipment,
    wherein the hydrocarbon dispersant is added to the water in an amount from about 0.5 ppm to about 150 ppm and the silt dispersant is added to the water in an amount from about 0.5 ppm to about 10 ppm based on volume of the composition.

3. The method of claim 2, wherein said equipment is selected from the group consisting of evaporators, once through steam generators, and heat exchangers.

4. The method of claim 2, wherein said silt dispersant is a homopolymer or a copolymer of one or more monomers, optionally wherein said one or more monomers are selected from the group consisting of acrylic acid, methacrylic acid, α-halo acrylic acid, maleic acid, itaconic acid, vinyl acetic acid, allyl acetic acid, fumaric acid, β-carboxylic acrylate, and any combination or salt thereof.

5. The method of claim 2, wherein the silt dispersant comprises an acrylic acid monomer copolymerized with a member selected from the group consisting of styrene sulfonic acid, 2-acrylimido-2-methylpropylsulfonic acid, 2-methyacrylimido-2-methylpropylsulfonic acid, vinyl sulfonic acid, sulfoalkyl acrylate, sulfoalkyl methacrylate, allyl sulfonic acid, 3-methacrylamido-2-hydroxypropylsulfonic acid, and any combination or salt thereof.

6. The method of claim 2, wherein the silt dispersant is a terpolymer of acrylic acid, acrylamide, and sulfonated acrylamide.

7. The method of claim 2, wherein the composition is added continuously to an inlet of a heat exchanger.

8. A method for dispersing a foulant deposited on equipment, comprising:
  contacting the foulant with an aqueous solution comprising water, a silt dispersant, and a hydrocarbon dispersant, wherein the silt dispersant comprises an acrylic acid monomer copolymerized with a member selected from the group consisting of styrene sulfonic acid, 2-acrylimido-2-methylpropylsulfonic acid, 2-methyacrylimido-2-methylpropylsulfonic acid, vinyl sulfonic acid, allyl sulfonic acid, 3-methacrylamido-2-hydroxypropylsulfonic acid, and any combination or salt thereof; and
  wherein the foulant comprises silt and a component selected from the group consisting of tar, grease, oil, bitumen, organic salt, naphthenate, hydrocarbon, and any combination thereof;
  dispersing the foulant deposited on the equipment;
    wherein the hydrocarbon dispersant is a high EO Nonyl phenol resin, and
    wherein the hydrocarbon dispersant is added to the water in an amount from about 0.5 ppm to about 150 ppm and the silt dispersant is added to the water in an amount from about 0.5 ppm to about 10 ppm, based on volume of the aqueous solution.

9. The method of claim 1, wherein the component is selected from the group consisting of tar, oil, bitumen, hydrocarbon, and any combination thereof.

10. The method of claim 1, wherein the component is bitumen.

11. The method of claim 1, wherein the component is tar.

* * * * *

UNITED STATES PATENT AND TRADEMARK OFFICE
CERTIFICATE OF CORRECTION

PATENT NO. : 10,196,287 B2
APPLICATION NO. : 13/798572
DATED : February 5, 2019
INVENTOR(S) : Jasbir S. Gill et al.

Page 1 of 1

It is certified that error appears in the above-identified patent and that said Letters Patent is hereby corrected as shown below:

In the Claims

In Column 10, Claim 1, Line 27, after "on" delete "the".

In Column 10, Claim 2, Line 37, delete "naphthenale," and insert -- naphthenate, --, therefor.

In Column 10, Claim 2, Line 43, delete "ppm" and insert -- ppm, --, therefor.

In Column 10, Claim 5, Line 59, delete "methyacrylimido-" and insert -- methylacrylimido- --, therefor.

In Column 11, Claim 8, Line 8-9, delete "2-methyacrylimido-" and insert -- 2-methylacrylimido- --, therefor.

Signed and Sealed this
Tenth Day of September, 2019

Andrei Iancu
*Director of the United States Patent and Trademark Office*